US007804772B2

(12) United States Patent
Min et al.

(10) Patent No.: US 7,804,772 B2
(45) Date of Patent: Sep. 28, 2010

(54) RECEIVER HAVING INTEGRATED SPECTRAL ANALYSIS CAPABILITY

(75) Inventors: Jonathan S. Min, Buena Park, CA (US); Fang Lu, Irvine, CA (US); Bruce J. Currivan, Irvine, CA (US); Kevin Eddy, Redendo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2006 days.

(21) Appl. No.: 10/164,355

(22) Filed: Jun. 7, 2002

(65) Prior Publication Data

US 2003/0021237 A1    Jan. 30, 2003

Related U.S. Application Data

(60) Provisional application No. 60/296,445, filed on Jun. 8, 2001, provisional application No. 60/296,450, filed on Jun. 8, 2001.

(51) Int. Cl.
*H04J 1/16* (2006.01)
*H04L 12/26* (2006.01)
(52) U.S. Cl. ............ 370/230; 370/230.1; 370/235
(58) Field of Classification Search ............ None
See application file for complete search history.

(56) References Cited

U.S. PATENT DOCUMENTS

| 4,621,365 | A | | 11/1986 | Chiu ............ 375/1 |
| 5,204,970 | A | * | 4/1993 | Stengel et al. ......... 455/69 |
| 5,598,441 | A | * | 1/1997 | Kroeger et al. ......... 375/344 |
| 5,754,535 | A | | 5/1998 | Vandenabelle et al. |
| 5,889,765 | A | | 3/1999 | Gibbs |
| 5,898,684 | A | | 4/1999 | Currivan et al. ......... 370/350 |
| 5,983,315 | A | | 11/1999 | Larky et al. |
| 6,028,860 | A | | 2/2000 | Laubach et al. |
| 6,075,972 | A | | 6/2000 | Laubach et al. |
| 6,078,607 | A | | 6/2000 | Monroe et al. ......... 375/145 |
| 6,081,533 | A | | 6/2000 | Laubach et al. |
| 6,084,919 | A | * | 7/2000 | Kleider et al. ......... 375/285 |
| 6,108,307 | A | | 8/2000 | McConnell et al. |
| 6,134,286 | A | | 10/2000 | Chennakeshu et al. ...... 375/365 |
| 6,137,793 | A | | 10/2000 | Gorman et al. |
| 6,198,750 | B1 | | 3/2001 | Buchholz et al. |
| 6,236,678 | B1 | | 5/2001 | Horton, Jr. et al. |
| 6,363,107 | B1 | | 3/2002 | Scott ............ 375/150 |
| 6,546,017 | B1 | | 4/2003 | Khaunte |

(Continued)

FOREIGN PATENT DOCUMENTS

EP    1 096 736 A2    5/2001

(Continued)

OTHER PUBLICATIONS

International Search Report for Appln. No. PCT/US02/17935 issued Dec. 20, 2002, 6 pages.

*Primary Examiner*—Raj Jain
(74) *Attorney, Agent, or Firm*—Sterne, Kessler, Goldstein & Fox P.L.L.C.

(57) ABSTRACT

A method of managing traffic in a communications channel includes the steps of receiving a subscriber ID corresponding to a subscriber, performing a spectral analysis on a signal received from the subscriber within a time interval identified by the subscriber ID, and adjusting transmission characteristics of the subscriber based on the spectral analysis.

47 Claims, 9 Drawing Sheets

U.S. PATENT DOCUMENTS

| | | |
|---|---|---|
| 6,650,624 B1 | 11/2003 | Quigley et al. |
| 6,741,551 B1 * | 5/2004 | Cherubini .................. 370/210 |
| 6,788,707 B1 | 9/2004 | Horton et al. |
| 6,898,755 B1 | 5/2005 | Hou |
| 6,917,614 B1 | 7/2005 | Laubach et al. |
| 6,961,314 B1 | 11/2005 | Quigley et al. |
| 7,009,944 B1 * | 3/2006 | Hulbert .................... 370/278 |
| 7,120,123 B1 | 10/2006 | Quigley et al. |
| 7,139,283 B2 | 11/2006 | Quigley et al. |
| 2002/0085491 A1 * | 7/2002 | Beshai et al. ............... 370/230 |
| 2002/0131413 A1 | 9/2002 | Tsao et al. |
| 2002/0154655 A1 | 10/2002 | Gummalla et al. |
| 2003/0035442 A1 | 2/2003 | Eng |
| 2003/0058837 A1 | 3/2003 | Denney et al. |

FOREIGN PATENT DOCUMENTS

| | | |
|---|---|---|
| WO | WO 00/01168 A2 | 1/2000 |
| WO | WO 01/17168 A2 | 3/2001 |

* cited by examiner

RECEIVER HAVING INTEGRATED SPECTRAL ANALYSIS CAPABILITY

CROSS-REFERENCE TO RELATED APPLICATIONS

This application claims priority to U.S. Provisional Patent Application No. 60/296,450, filed on Jun. 8, 2001, entitled "ROBUST BURST DETECTION ACQUISITION SYSTEM AND METHOD," to U.S. Provisional Patent Application No. 60,296,445, filed on Jun. 8, 2001, entitled "RECEIVER HAVING INTEGRATED SPECTRAL ANALYSIS CAPABILITY," and is related to U.S. patent application Ser. No. 60/106,441, filed on Oct. 30, 1998, entitled "BURST RECEIVER SYSTEM," all of which are incorporated herein by reference.

BACKGROUND OF THE INVENTION

1. Field of the Invention

The present invention generally relates to a multiple subscriber communications system, and more particularly, to a spectral analysis of transmissions received from a communications medium.

2. Background Art

Communications networks often include a controller element that controls the allocation of resources on a network. For example, a Data Over Cable Based Communications System (DOCSIS), includes one or more headends, which control communications traffic originating from one or more subscribers (referred to herein as upstream traffic). System capacity allocated for upstream traffic is shared among multiple subscribers using capacity allocation schemes known as frequency division multiple access (FDMA) and time division multiple access (TDMA).

An FDMA system typically includes multiple frequency channels. Within an FDMA channel, upstream traffic transmission signals must conform to various requirements. Examples of these requirements include spectral mask limits, power limits, and spurious component limits. Frequency spectrum measurements are useful for determining whether such requirements are satisfied.

To optimally provide communications capacity for upstream traffic, it is desirable to obtain spectral information for each upstream transmission. Previous systems have employed swept spectrum analyzers to provide spectral information. Unfortunately, these analyzers have several disadvantages.

Two such disadvantages involve size and cost. Swept spectrum analyzers are typically bulky and expensive. Hence relatively few units can be provided in a receiver due to economical and size constraints.

Further disadvantages occur because a swept spectrum analyzer requires a time interval to "sweep" its analysis filter across a frequency band. Such time intervals may cause transient events to be missed that occur when the analysis filter is not tuned to the frequency where the event occurred. Examples of such transient events include impulse or burst noise.

Furthermore, since a swept spectrum analyzer sweeps its analysis filter across the band, it causes a linkage between the time and frequency domains. For this reason, it may be difficult to discriminate between the effects of transient time-domain and frequency-domain events.

In TDMA or SCDMA (Synchronous Code Division Multiple Access) systems, it is desirable to synchronize spectral analysis to particular transmissions that are scheduled into TDMA or SCDMA slots. Unfortunately, swept spectrum analyzers cannot be readily synchronized in this manner.

Accordingly, there is a need for techniques for obtaining spectral information for upstream transmissions that overcome the disadvantages and limitations described above.

BRIEF SUMMARY OF THE INVENTION

The present invention is directed to a burst receiver having integrated spectral analysis capability that substantially obviates the problems and disadvantages in the related art.

One advantage of the present invention is being able to provide a spectral analysis of each burst that corresponds to a particular subscriber.

Another advantage of the present invention is being able to output the results of the spectral analysis to an external media access controller.

Another advantage of the present invention is being able to use the results of the spectral analysis to cancel ingress noise.

Another advantage of the present invention is being able to modify transmission characteristics of each individual subscriber in response to the information provided by the spectral analysis.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of managing traffic in a communications channel including the steps of receiving a subscriber ID corresponding to a subscriber, performing a spectral analysis on a signal received from the subscriber within a time interval identified by the subscriber ID, and adjusting transmission characteristics of the subscriber based on the spectral analysis.

In another aspect of the present invention there is provided a method of controlling transmission in a communications channel including the steps of receiving a subscriber ID identifying a time interval corresponding to a subscriber, performing a spectral analysis on a packet received during the time interval identified by the subscriber ID, and adjusting transmission characteristics of the subscriber based on the spectral analysis.

In another aspect of the present invention there is provided a shared communications channel receiver including a burst receiver, a spectrum analyzer for analyzing a data stream received by the burst receiver, and a media access controller interface that receives a command from a media access controller, wherein the spectrum analyzer provides a spectral analysis of a packet received by the burst receiver and corresponding to a subscriber ID provided by the command from the media access controller.

In another aspect of the present invention there is provided a method of controlling communications traffic across an upstream traffic channel including the steps of specifying a spectral analysis time interval, receiving an upstream transmission within the spectral analysis time interval, performing a spectral analysis of the received upstream transmission, and adjusting a transmission characteristic of the upstream traffic channel based on the spectral analysis.

In another aspect of the present invention there is provided a receiver including a communications module that receives an upstream transmission from a shared communications medium, a controller interface that receives a transmission schedule and a spectral analysis command, and a spectral analysis processor that performs spectral analysis on the upstream transmission in response to the spectral analysis command.

In another aspect of the present invention there is provided a method of controlling communications traffic across a traffic channel including the steps of specifying a time interval, receiving an upstream transmission within the time interval, and performing a spectral analysis of the received upstream transmission.

In another aspect of the present invention there is provided a burst receiver having integrated spectral analysis capability, including a communications module adapted to receive upstream transmissions from a shared communications medium, a controller interface adapted to receive a transmission schedule and a spectral analysis command, and a spectral analysis processor that performs spectral analysis on the upstream transmissions in response to the spectral analysis command.

In another aspect of the present invention there is provided a method of controlling communications traffic across a shared traffic channel including the steps of specifying a time interval, receiving a transmission within the time interval, performing a spectral analysis of the transmission, and adjusting one or more transmission characteristics of the shared traffic channel based on the spectral analysis.

In another aspect of the present invention there is provided a TDMA receiver including a burst receiver, an interface module for interfacing to a media access controller and for receiving a subscriber ID corresponding to a subscriber, and a spectrum analyzer for analyzing signals received by the burst receiver in mini-slots allocated to the subscriber ID.

The present invention is directed to methods and systems for controlling communications traffic across an upstream traffic channel. The methods and systems specify a spectral analysis time interval, receive an upstream transmission within the spectral analysis time interval, perform a spectral analysis of the received upstream transmission, and adjust one or more transmission characteristics of the upstream traffic channel based on the spectral analysis.

Specifying a spectral analysis time interval may include specifying a time interval corresponding to an upstream transmission from a particular subscriber. Alternatively, specifying a spectral analysis time interval may include specifying one or more time division multiple access (TDMA) mini-slots.

Performing a spectral analysis of the received upstream transmission may include generating a discrete Fourier transform (DFT) sequence from the upstream transmission.

Adjusting one or more transmission characteristics of the upstream traffic channel may include changing an upstream transmission symbol rate, changing an upstream transmission modulation type, changing forward error correction parameters (e.g., Reed Solomon parameters), or changing an upstream transmission power level.

The present invention is also directed to a receiver having integrated spectral analysis capability. This receiver may include a communications module adapted to receive a plurality of upstream transmissions from a shared communications medium, a controller interface adapted to receive a transmission schedule and a spectral analysis command, and a spectral analysis processor adapted to perform spectral analysis on one or more of the upstream transmissions in response to the spectral analysis command.

It is to be understood that both the foregoing general description and the following detailed description are exemplary and explanatory and are intended to provide further explanation of the invention as claimed.

BRIEF DESCRIPTION OF THE DRAWINGS/FIGURES

The present invention will be described with reference to the accompanying drawings. In the drawings, like reference numbers generally indicate identical, functionally similar, and/or structurally similar elements.

Figure 1A:
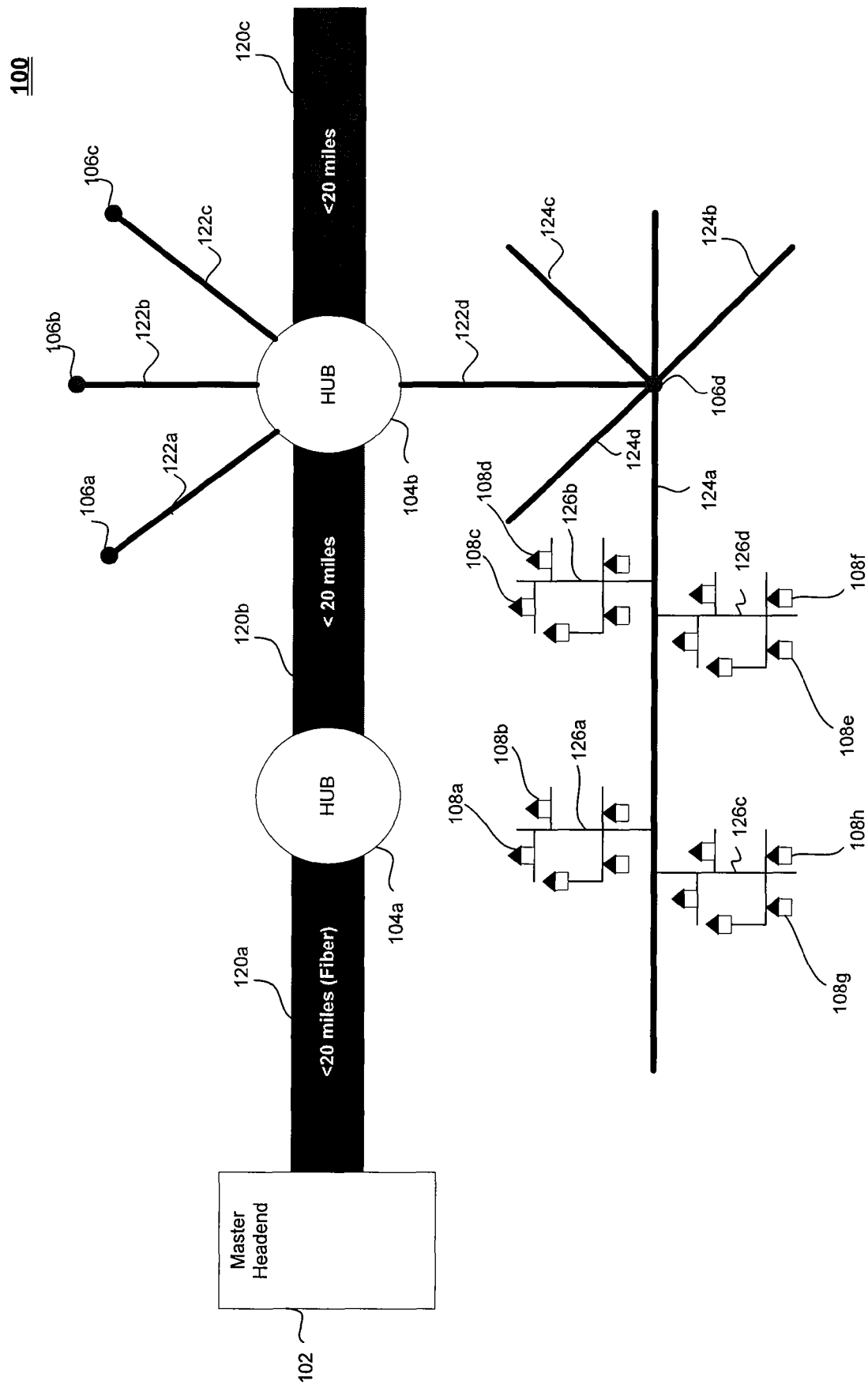
FIG. 1A is a block diagram of an exemplary cable-based communications system.
Figure 2A:
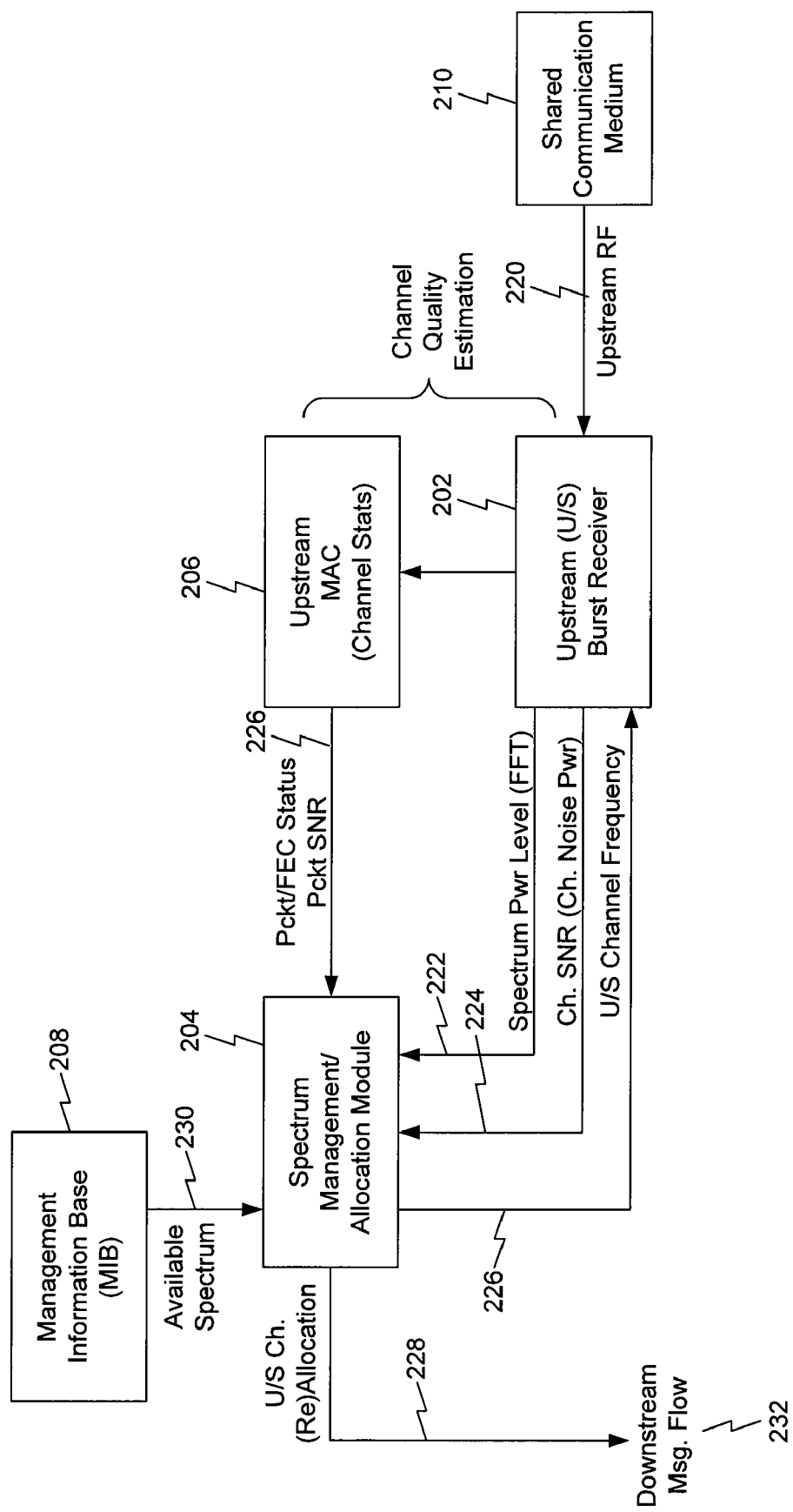
Figure 2B:
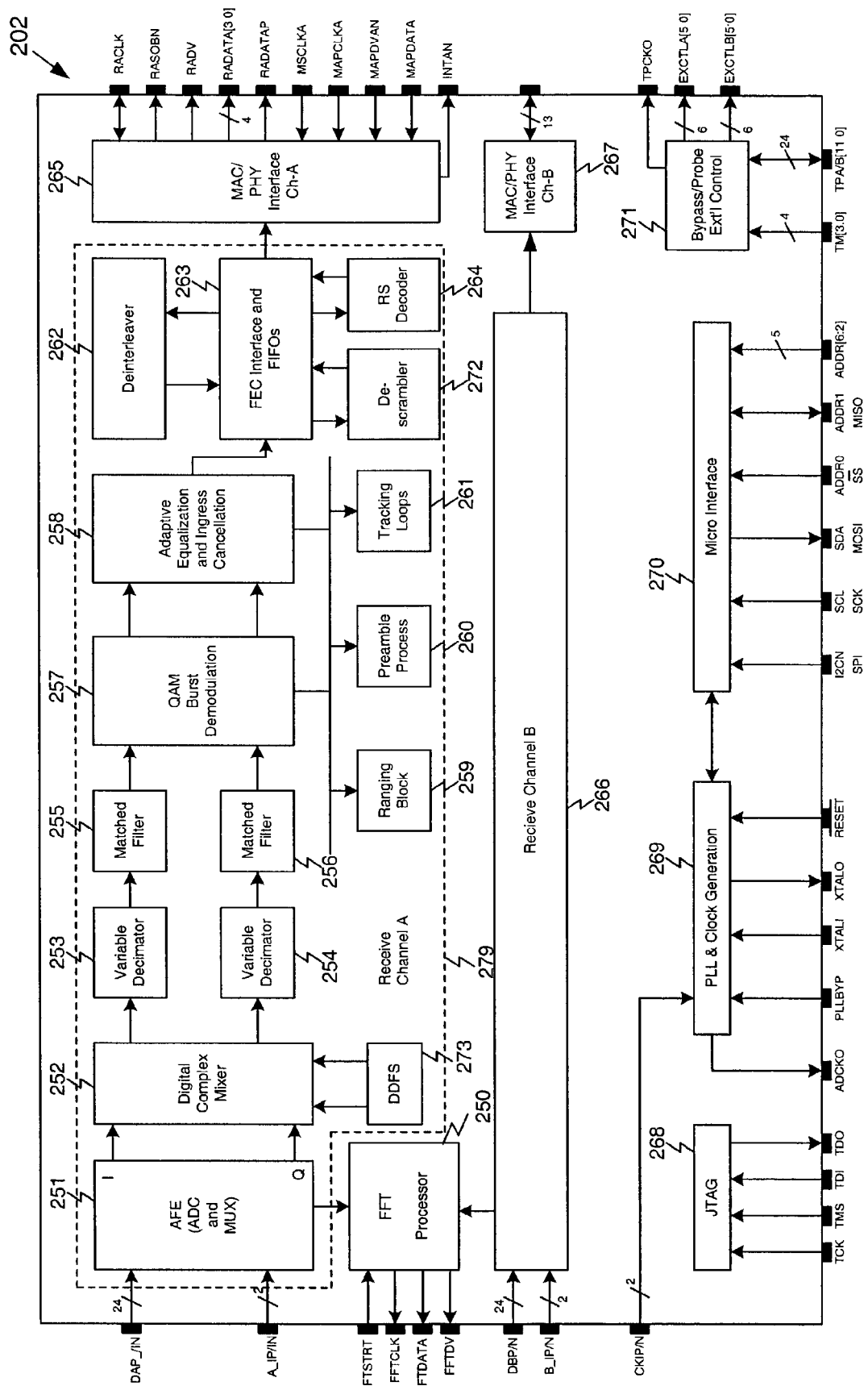
Figure 3:
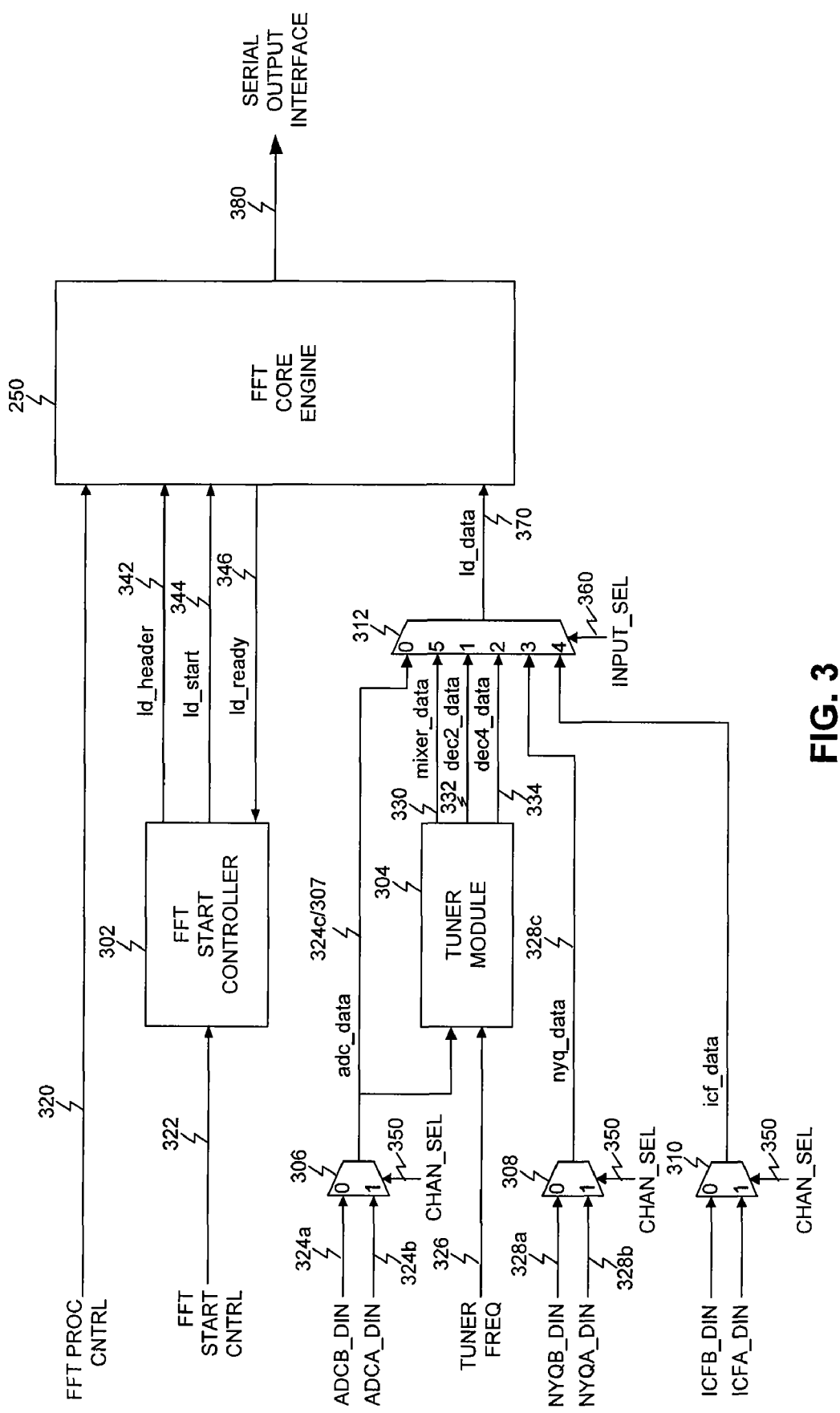
Figure 4:
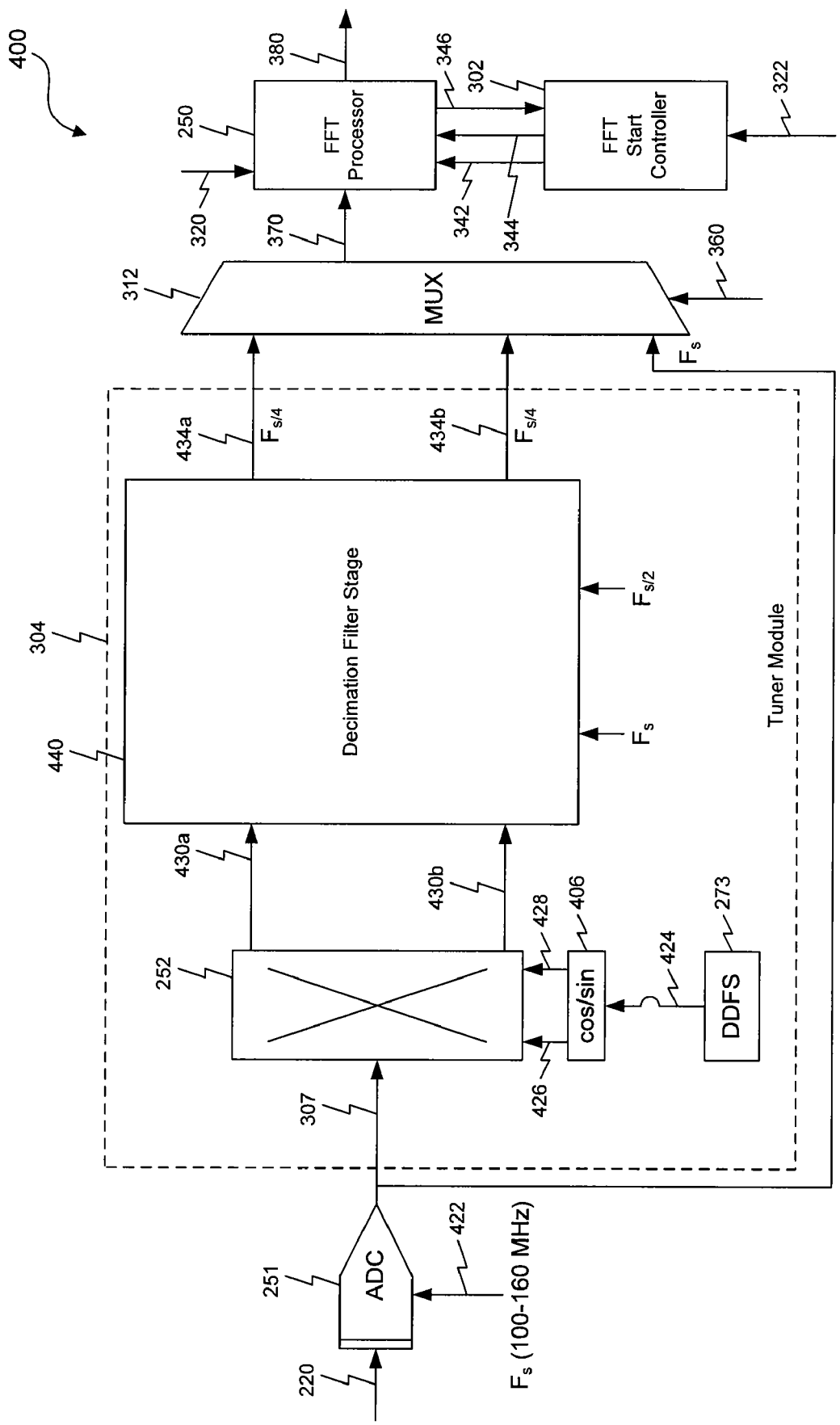
Figure 5:
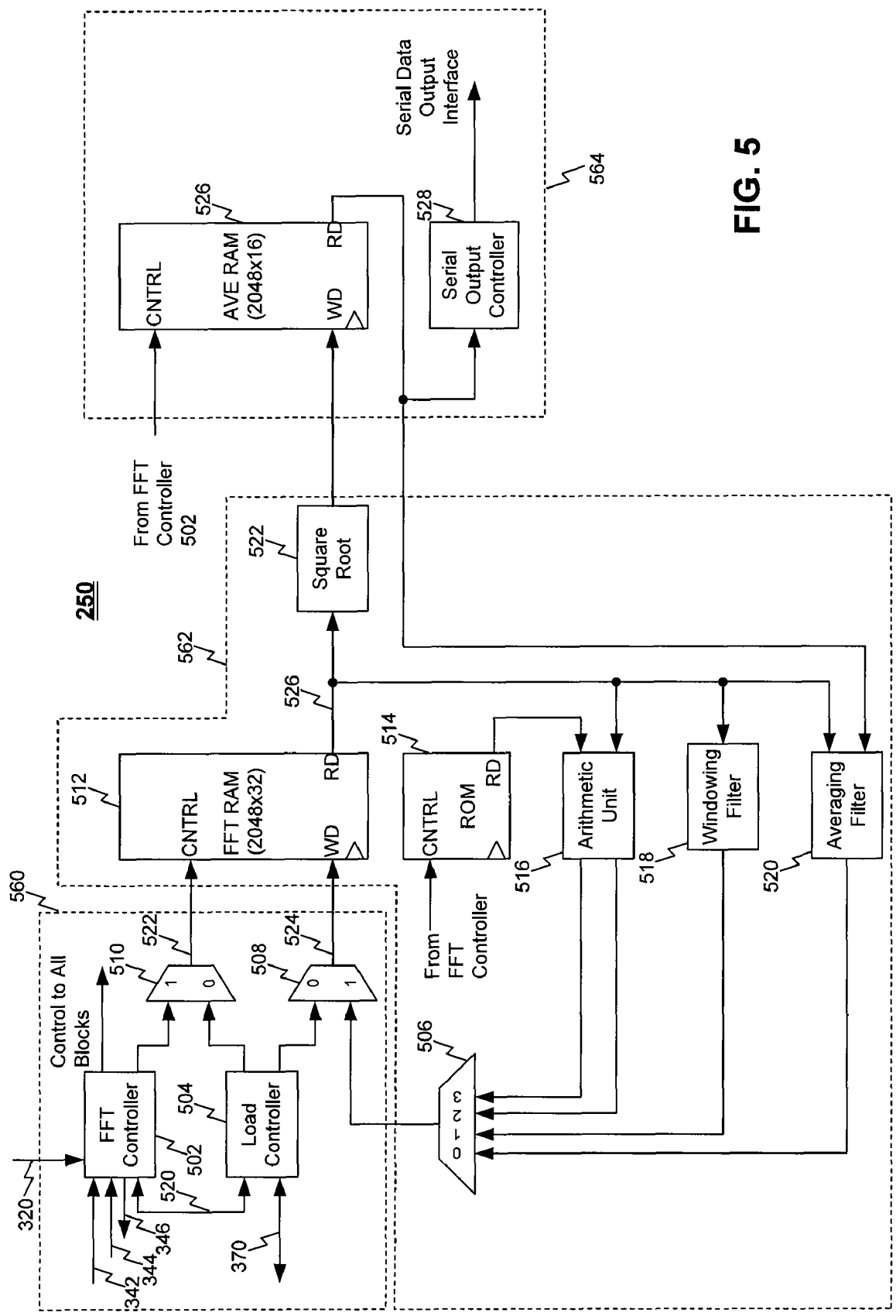
Figure 6:
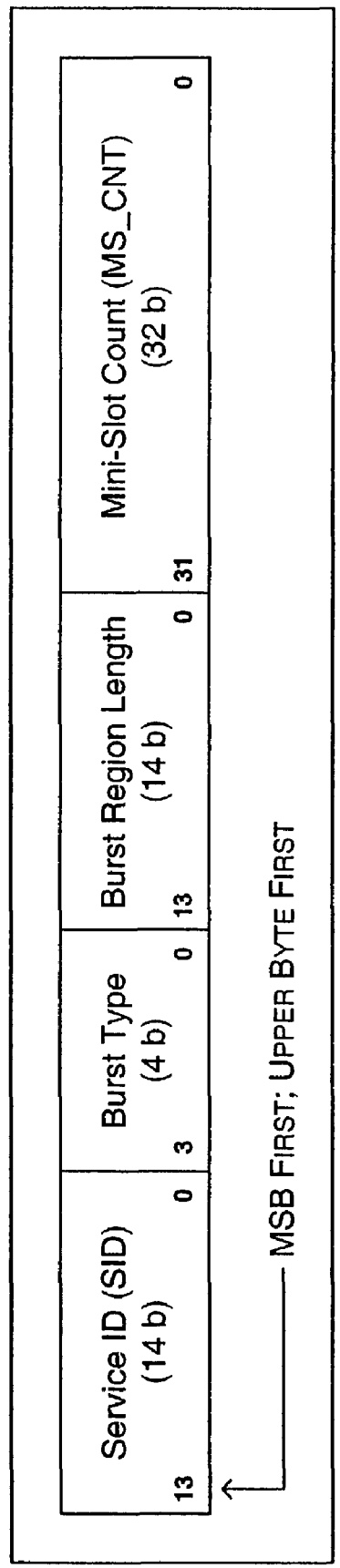
Figure 7:
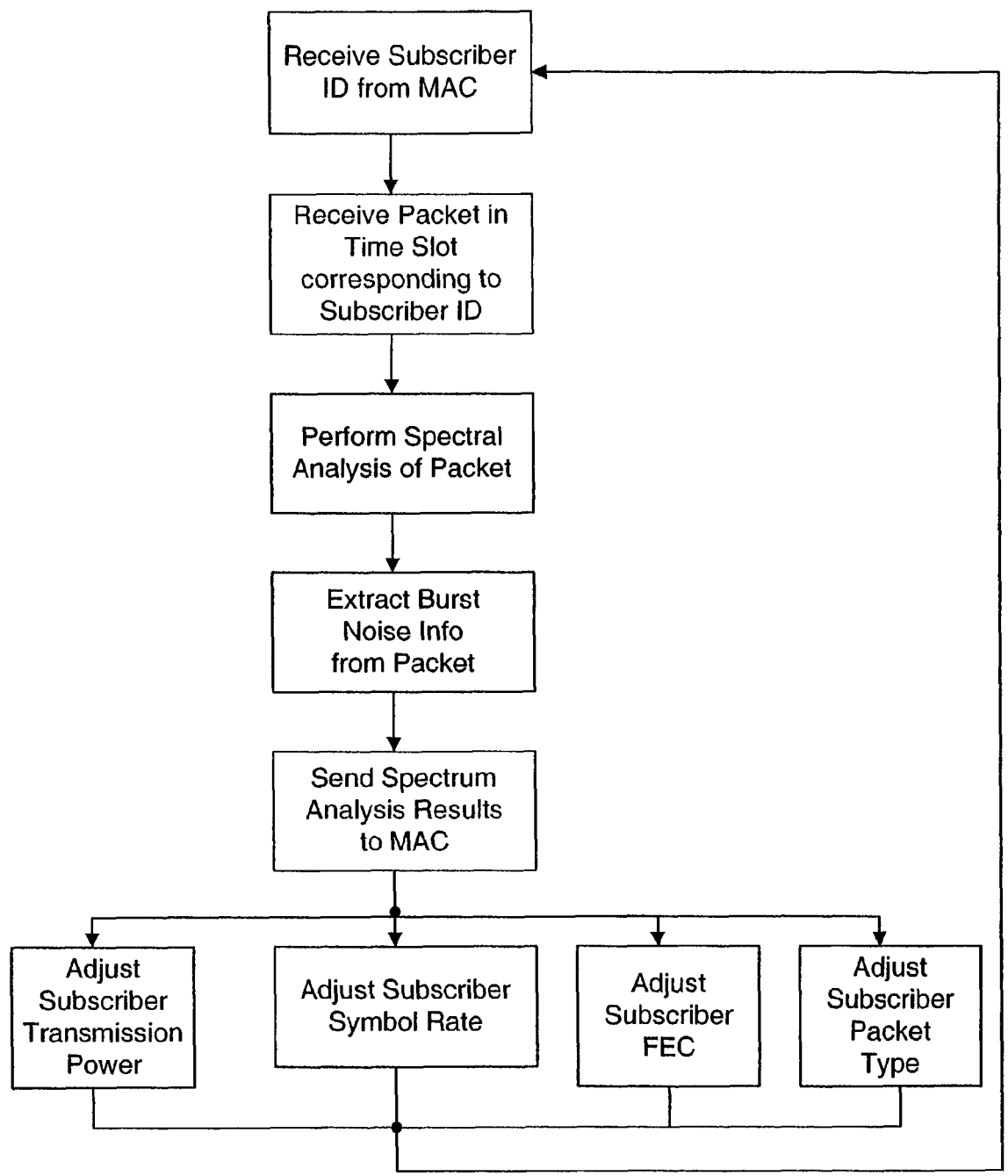

FIG. 2A further illustrates the relationship between components at a headend of a cable modem termination system (CMTS) of FIG. 1A;

FIG. 2B is a block diagram illustrating a versed receiver of one embodiment of the present invention;

FIG. 3 is a block diagram of an FFT processor of the present invention;

FIG. 4 is a block diagram illustrating an implementation of the spectral analysis module of one embodiment of the present invention;

FIG. 5 is a block diagram illustrating additional detail of the FFT processor of one embodiment of the present invention;

FIG. 6 is a diagram illustrating the structure of the bandwidth allocation map (MAP) used in TDMA communication; and FIG. 7 is a generalized flowchart showing the operation of the burst receiver of the present invention.

DETAILED DESCRIPTION OF THE INVENTION

Reference will now be made in detail to the embodiments of the present invention, examples of which are illustrated in the accompanying drawings.

As the invention is directed to a receiver for use in a shared-medium communications system, it is particularly useful in a time division multiple access (TDMA) communications system or an SCDMA system. For example, the present invention may be implemented in an upstream communications channel of a cable based broadband communications system, such as a DOCSIS network.

FIG. 1A is a block diagram of an exemplary cable based communications system 100 according to the present invention. The communications system 100 includes a master headend 102, hubs 104*a-b*, nodes 106*a-d*, and a plurality of subscribers 108. The subscribers 108 exchange bidirectional communications traffic with master headend 102 through various optical and electrical media. For instance, communications traffic is passed between the master headend 102 and the hub(s) 104 through optical media, while communications traffic is passed between the nodes 106 and the subscribers 108 through electrical media. These optical and electrical media are described below.

Fiber optic backbone segments 120*a-c* provide an interconnection between the master headend 102 and the hubs 104. As shown in FIG. 1A, the backbone segments 120*a-c* each have exemplary distances of twenty miles or less. However, distances greater than twenty miles are within the scope of the present invention.

The nodes 106 each provide an interface between optical communications media and electrical communications media. As shown in FIG. 1A the fiber optic lines 122 establish connections between the hubs 104 and the nodes 106. For example, the fiber optic line 122*d* connects the hub 104*b* and the node 106*d*. Also, the nodes 106 are each coupled to one or more coaxial cables 124. The coaxial cables 124, in conjunction with coaxial cables 126, exchange electrical signals with the subscribers 108. For example, the coaxial cable 124*a* and the coaxial cable 126*d* connect the node 106*d* with the subscribers 108*e* and 108*f*.

Traffic in the communications system 100 includes upstream traffic and downstream traffic. Downstream traffic is received by the subscribers 108 from system elements, such as the master headend 102. In contrast, upstream traffic is originated by the subscribers 108 and directed to system elements, such as the master headend 102.

For the coaxial cables 124, the upstream and downstream traffic are each allocated to a particular frequency band. For example, upstream traffic may be allocated to a 5-42 MHz frequency band, while downstream traffic may be allocated to a 54-860 MHz frequency band. One or more frequency channels exist within these frequency bands that provide for the transmission of signals.

These signals are modulated according to a digital modulation scheme, such as quadrature amplitude modulation (QAM) or quadrature phase shift keying (QPSK).

Multiple subscribers 108 share the electrical and optical communications media of the communications system 100. For instance, in the context of the coaxial cables 124 and 126, the subscribers 108 transmit signals across the same frequency channel in the same coaxial cable 124. To accommodate such frequency channel sharing, the communications system 100 employs a multiple access technique, such as TDMA or SCDMA for upstream traffic.

TDMA is a transmission scheme that allows a number of subscribers 108 to transmit information across a single frequency channel without interference.

This is enabled by allocating unique time slots to each subscriber 108. According to TDMA, the subscribers 108 send upstream transmissions across a channel during one or more time slots that occur within a TDMA frame. Various types of time slots exist. Three examples are reservation slots, contention slots, and maintenance slots.

The present invention provides a receiver having on-board spectral analysis capabilities that may be synchronized to one or more particular upstream transmissions. Accordingly, the receiver may be included in the communications system 100 elements, such as the nodes 106, the hubs 104 and/or the master headend 102. The receiver may be implemented on a chip.

Embodiments of the present invention employ techniques that digitally compute spectral information corresponding to one or more transmissions. For example, the present invention may employ Fast Fourier Transforms (FFT), filter banks, such as quadrature mirror filter banks and wavelet filter banks, and any other spectral analysis techniques that are apparent to persons skilled in the relevant art.

An embodiment of the present invention further provides an on-chip spectral analysis capability that is traditionally performed by general-purpose processors, rather than by receivers such as TDMA burst receivers. This on-chip capability advantageously provides for the performance of sophisticated spectrum management functions in a practical and economical manner. For instance, the present invention eliminates the need for external spectrum computation equipment. Furthermore, the present invention does not require special software to be written to compute the spectrum.

This spectral analysis may indicate the spectral shape of transmitted signals, including whether they meet any specified transmit spectral mask(s). In addition, this analysis reveals the presence of interfering signals, the background noise floor (including its level and shape), and the presence of partial spectral nulls in the upstream transmission signals. Such nulls indicate reflections (echoes) in the upstream path.

When operating in a TDMA or SCDMA environment, this spectral analysis (e.g., performing an FFT) may be synchronized to one or more time intervals (for example, mini-slots in a TDMA environment). This permits the analysis of the spectrum of a single user transmission, and/or a class of user transmissions (e.g., for each type of TDMA slot). As a result, this spectrum analysis yields channel quality information that can be used to efficiently manage the usage of TDMA, FDMA, SCDMA and TDMA/FDMA systems. (In the remainder of the description, reference will be primarily to TDMA, although it will be appreciated that the invention is applicable to the other systems mentioned above.)

This channel quality information may include spectral measurements arranged in a plurality of bins that each correspond to a respective frequency range. These bins are each computed from the same block of transmission signal samples. Thus, the present invention eliminates the aforementioned confusion generated by swept spectrum analyzers, since no sweeping occurs.

This generated channel quality information may be time stamped with, for example, a TDMA frame clock value to provide for subsequent spectral analysis, and communication system management/control.

FFT's are Discrete Fourier Transform (DFT) calculations performed using a minimal number of operations. A DFT is calculated from a discrete-time signal, x(n) having a length N, according to Equation (1), below.

$$X(k) = \sum_{n=0}^{N-1} x(n) e^{-jk\omega_0 n}, \quad 0 \le k \le N-1$$

In the above equation, X(k) represents the DFT of x(n), and $\omega_0 = 2\pi/N$. Like x(n), X(k) is a sequence having a length N. X(k) provides samples, equally spaced in frequency, of the Fourier transform of x(n). The DFT is itself a sequence rather than a function of a continuous variable, and it corresponds to samples, equally spaced in frequency, of the Fourier transform of the signal.

One embodiment of the present invention provides an on-chip FFT computation capability integrated into a headend burst receiver chip. The spectral computations may be synchronized to TDMA slot(s). Alternatively, external triggers can also be used to synchronize spectral computations. The results of spectral computations are made available at the chip output via a serial interface.

FFT computations may be performed on various signals within the receiver chip. For example, FFT computations may be performed on raw analog to digital (A/D) converter samples of received transmissions. Alternatively, FFT computations may be performed on the output of a first halfband filter (sample clock decimated by 2), the output of a second halfband filter (sample clock decimated by 4), or the output of a Nyquist filter (4 samples per symbol).

An exemplary sample clock frequency $F_{SMPL}$ for such FFT computations is 164 MHz. However, other clock frequencies may be employed. The computed FFT's may have variable lengths. Exemplary lengths include 256, 512, 1024 and 2048 points.

The FFT results may be output in an averaged format. For example, a programmable time constant may be employed that provides "video averaging" functionality that is common in a swept spectrum analyzer. Moreover, FFT results may be output in various formats. Exemplary output formats include FFT bin magnitude, FFT bin power, and FFT bin complex values.

Additionally, FFT results may be output in a bypass mode where the input is connected directly to the output, with no FFT being computed.

In the embodiment, the FFT computations are performed in 5.1 msec or less, have an approximately 60 dB dynamic range for the detection of a tone, and have an approximately 90 dB noise floor dynamic range.

Furthermore, windowing may be employed to reduce the effects of short data records. Exemplary window functions used to provided this feature include Hanning, Hamming, Blackman, Harris, as well as rectangular (no window). The windows are implemented in the frequency domain, that is, by filtering the FFT output, in order to save hardware.

Capabilities of an FFT engine integrated in a TDMA receiver include spectrum management of the channel, channel quality measurement per group, input selection programmability, user selection capabilities in a TDMA system (per SID, Burst_type, MS-count), prepending of timing information (MS_count) for other applications, and averaging/bypass mode.

Figure 1B:
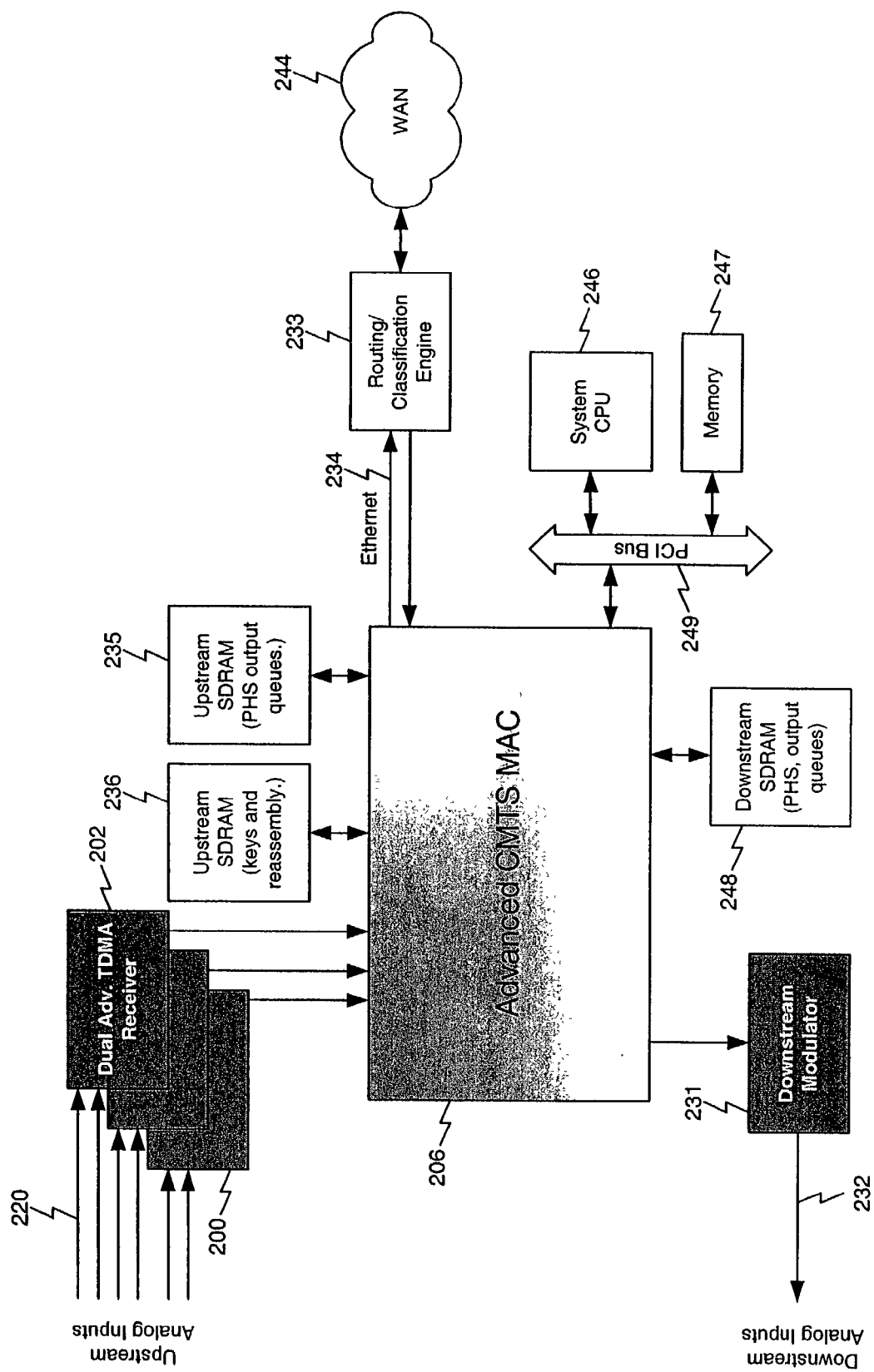
FIG. 1B is a diagram illustrating the headend architecture at a cable modem termination system (CMTS)

FIG. 1B further illustrates the configuration of the master headend 102 of one embodiment of the present invention. As illustrated in FIG. 1B, analog inputs 220 are received by a burst receiver 202. The burst receiver 202 communicates with a MAC controller 206. In one embodiment, the MAC controller 206 may be a BCM3212 chip.

The MAC controller 206 communicates over the Ethernet 234 with a Routing/Classification Engine 233, which in turn is connected to a Wide Area Network 244 (WAN).

The MAC controller 206 utilizes upstream SDRAM 236 for keys in reassembly, and further utilizes upstream SDRAM 235 for PHS output queues.

The MAC controller 206 is connected to a PCI bus 249, and through the PCI bus 249 to a System CPU 246 and a System Memory 247.

The MAC controller 206 is further connected to a downstream SDRAM 248. Data flows through the downstream modulator 231, which in one embodiment may be Broadcom's BCM3034 chip, and is then output as downstream analog transmission 232.

FIG. 2A is a block diagram illustrating the spectrum management architecture of the present invention. This architecture includes the upstream burst receiver 202, a spectrum management/allocation module 204, the upstream media access controller (MAC) 206, and a management information base (MIB) 208.

The upstream burst receiver 202 receives an upstream transmission 220 from a shared communications medium 210, which may be one of several types of communications media, for example, a coaxial cable, a fiber optic transmission medium, a satellite communications system, or a wireless medium that conveys wireless radio frequency (RF) signals.

The upstream transmission 220 is a burst transmission (also referred to herein as a packet) that is transmitted by a user, such as the subscriber 108 (see FIG. 1A). The upstream burst receiver 202 acquires the timing of packet 220 and decodes it according to an error correction coding scheme (e.g., Reed Solomon), and obtains the payload (i.e., user data) from each packet 220.

The upstream burst receiver 202 passes some of the recovered information to the MAC controller 206. For example, some burst transmissions from users are requests for bandwidth allocation. The MAC controller 206 receives such requests and, in response, allocates upstream communications capacity to satisfy such requests. In addition, the upstream burst receiver 202 transfers traffic performance statistics to the MAC controller 206. Examples of these statistics include packet error rates (PER) and signal to noise ratios (SNR).

The spectrum management/allocation module 204 receives information from the upstream burst receiver 202, the MAC controller 206 and the MIB 208. From this information, the spectrum management/allocation module 204 generates upstream channel frequency assignments, which are sent to the upstream burst receiver 202. These assignments instruct the upstream burst receiver 202 to operate within certain portions of the upstream RF spectrum. In addition, the spectrum management/allocation module 204 generates an upstream channel allocation message 228 that is sent to the subscribers 108. This message directs the subscribers 108 to operate within certain portions of the RF spectrum.

The spectrum management/allocation module 204 receives a channel quality message 226 from the MAC controller 206. This message includes information such as packet error rates (PER), and packet SNR.

The spectrum management/allocation module 204 receives an FFT message 222 from the upstream burst receiver 202. In addition, the spectrum management/allocation module 204 receives a channel SNR (channel noise power) message 224 from the upstream burst receiver 202.

The spectrum management/allocation module 204 receives a spectrum availability message 230 from the MIB 208.

The spectrum management/allocation module 204 processes these received messages and, in response, generates a spectrum allocation plan. The spectrum allocation plan designates which portions of the spectrum are used by which subscriber to transfer information across the shared communications medium 210. In addition, this plan specifies the characteristics of individual signals transmitted across these spectral portions. For example, the plan may specify transmit powers, data rates, and spacing between frequency channels in an FDMA environment.

As further shown in FIG. 2B, the embodiment includes an advanced dual-channel cable network receiver which accepts upstream burst data in a frequency-agile, time-division multiple access (TDMA) scheme. The architecture of the burst receiver 202 in one embodiment includes an FFT processor 250. The burst receiver 202 further includes an analog front end (AFE) 251 (including a multiplexer), which forwards the received data into a digital complex mixer 252 IP. The burst receiver 202 can decode signal formats from BPSK up to 256-QAM.

The analog front-end (AFE) 251, a QAM demodulator 257 and an FEC (forward error correction) decoder 263 are integrated for each channel. The AFE 251 performs A-to-D conversion on either an IF input, an RF input, or baseband I/Q inputs. A multiplexing logic may be also included to share the same ADC output between two receive channels or to receive digital samples from an external ADC. The multiplexing logic can receive external ADC outputs at much higher sampling rates to perform direct RF sampling. The multiplexing logic allows receiving two frequency channels from the same cable network, or process inputs from two separate cable networks. A Bypass/Probe/External Control 271 has two output ports to control external variable-gain amplifiers (VGA's) and/or external frequency synthesizers.

A digital quadrature down-mixer 252 translates an input spectral center to true DC. In the low-IF or regular IF input mode, the input channel's center frequency should have approximately the same clearance above DC and below ($F_{SMPL}/2$). The clearance equals the maximum of (0.625× max $F_{BAUD}$) and (SAW filter stopband width/2). For example, given max $F_{BAUD}$=5.12 MHz and the SAW stopband width =10 MHz, the clearance from DC and ($F_{SMPL}/2$) is max(3.2, 5.0)=5 MHz. Thus, the highest acceptable IF frequency in the low-IF mode is (40.96/2)−5=15.48 MHz, and the number in regular IF mode is (81.92/2)−5=35.96 MHz. The on-chip digital mixer 252 is used to move the quantized IF samples to true DC using quadrature carriers generated from a programmable direct digital frequency synthesizer (DDFS) 273. If an external ADC is chosen with a sample rate of 102.4 MHz, upstream RF channels from 5 to 42 MHz can be sampled all together. If the external ADC samples at 163.84 MHz, all channels from 5 to 65 MHz can be covered. The digital down-mixer 252 then translates the desired channel down to DC.

The I and Q samples pass through decimators 253, 254 and square-root raised cosine filters 255, 256 with an excess bandwidth α=0.25. The over-sampled I and Q signals from the digital down-mixer 252 pass through dual decimators 253, 254 that are programmed based on the expected symbol rate. The decimated samples pass through dual square-root Nyquist filters 255, 256 with an excess bandwidth a α=0.25 to match the pulse-shaping filters on the transmitter side. For any channel symbol rate, the adjacent channel suppression is better than 60 dB.

Fast burst detection and acquisition are performed on the preamble with programmable length and pattern. The fast acquisition for carrier phase and symbol timing is performed on preamble symbols. Each received TDMA burst contains a PHY overhead which includes a preamble using QPSK-like signaling, no matter what is the actual modulation format for the payload. Since the four-fold ambiguity of the carrier phase can be resolved by matching the preamble pattern, there is no need for differential coding which degrades the effective FEC performance. Depending on the payload modulation format, the burst receiver 202 may acquire burst synchronization on a preamble as short as 16 symbols, even if the burst-to-burst power variation is over 20 dB. An option of processing a BPSK preamble is also preferably provided. For legacy DOCSIS 1.0 and 1.1 systems, the preamble may also be in 16QAM format.

An adaptive equalizer 258 characterizes the RF channel response and removes inter-symbol interference (ISI) caused by micro-reflections. An equalizer is needed at high symbol rates, especially for high modulation level (beyond QPSK), to mitigate channel impairments due to micro-reflections. The embodiment implements a 24-tap complex linear (feed-forward) equalizer. During initialization, the equalizer 258 adapts to each subscriber channel and sends its coefficients to the MAC controller 206. The MAC controller 206 sends the information back to the individual subscriber 108 via the downstream path 232 to program the transmitter's pre-equalizer. This scheme avoids the need for long preambles for future incoming bursts from the same subscriber 108, and improves the overall efficiency of bandwidth usage.

An ingress-cancelling processor 258 suppresses narrow-band noise and/or adjacent-channel interference (ACI). The Forward Error Correction (FEC) decoder 263 performs deinterleaving, descrambling and RS decoding with flexible parameters. The recovered data stream is delivered and burst receiver 202 control inputs are accepted through a MAC/PHY receive interface 265 linked to a MAC controller 206. The embodiment can interface with the MAC controller 206 with serial bit transfer, and also supports an advanced MAC/PHY interface for higher data rates. An on-chip FFT processor can analyze an RF spectrum with a selectable bandwidth and length.

The ingress cancelling logic analyzes the noise environment of the desired upstream channel. The ingress cancelling logic then suppresses narrow-band ingress and/or adjacent-channel interference appearing in the desired upstream channel to maximize the usage of the entire upstream band.

The FEC decoder 263 performs the following tasks to overcome a low signal-to-noise ratio (SNR) and/or burst noise in the upstream channel:

The upstream transmitter scrambles the data stream to ensure adequate symbol transitions for symbol timing recovery in the burst receiver 202. A descrambler 272 recovers the raw data stream and reinitializes itself on each burst. The generator polynomial and initial seed are both programmable up to 23 bits. Also, the descrambler 272 is programmable to be either frame-synchronizing or self synchronizing.

The upstream transmitter performs data interleaving within each burst in a byte format. The interleaving type is block interleaving with variable block size and interleaving depth depending on the burst type. Thus, the deinterleaver 262 supports real-time changes on the interleaving block size and depth. In a dynamic mode, the deinterleaving block size can be adjusted within one burst to avoid leaving a small fraction for the last interleaving block.

The Reed-Solomon decoder 264 is over GF(256) and is programmable to correct errors from 1 to 16 bytes within an FEC data block (or codeword). The generator polynomial is also programmable. The last FEC codeword can be either fixed-length or shortened. The RS decoder 264 features a special architecture to handle real-time changes on the codeword size and correctable byte count without the need of time spacing between different types of bursts.

The FEC decoder 263 can be configured to have the descrambler located either before the deinterleaver 262 or after the RS decoder 264.

The data from the demodulator 257 and the equalizer 258 is utilized by a ranging block 259 in order to allow for different distances (ranges) to the transmitter. The wide-spread distance from headend to each subscriber in a cable network introduces relatively large receive timing and power uncertainties for the receiver, which must be compensated for by means of a ranging process during initialization. A special ranging sequence with a long preamble in a ranging time slot is preferably reserved. The ranging block 259 estimates the receive timing and amplitude of the ranging sequence and passes the measurements to the MAC controller 206. The MAC controller 206 assembles the information and sends it back to the individual subscriber 108 via the downstream path 232 (see FIG. 2A). The subscriber 108 can then adjust its own transmit timing and power level. Any large frequency offset in a transmitter is also measured and can be corrected during the ranging process.

A preamble processor 260 analyzes the preamble in each burst. The data from the preamble processor 260 is also utilized by the ranging block 259.

Tracking loops 261 also utilize the data from preamble processor 260. The operation of the digital tracking loops for carrier phase and symbol timing follows the initial preamble process. The preamble acquisition errors in amplitude, time, and carrier phase are merely initial degradation sources that will get reduced during tracking. Any drift in carrier frequency or symbol rate during a long packet is also tracked out. The tracking loops 261 further utilize the adaptive equalization and ingress cancellation module 258. Data is then forwarded to a forward error correction interface module 263.

Taking Receive Channel A 279 as an example, an interface to the MAC controller 206 includes received data signal, received data clock signal, and FEC data block valid signal. The Data-Over-Cable Interface Specification (DOCSIS) uses a TDMA scheme on each upstream RF channel whose time axis is partitioned into a sequence of burst regions. Each burst region allows one or more incoming bursts depending on the burst type. The allocation of burst regions for different upstream transmitters and different burst types is determined by the system management through the use of a Bandwidth Allocation Map (MAP). An example of a MAP is illustrated in FIG. 6. The burst receiver 202 needs to know the MAP information related to each burst region in advance so that it can prepare itself for receiving that particular burst (or group of bursts). The MAP information is transferred from the MAC controller 206 to the burst receiver 202 through four pins.

On each upstream frequency channel, the length of each burst region is allocated in mini-slots. Each mini-slot contains a programmable number of symbol cycles and is set during the system initialization. For Receive Channel A 279, the beginning of each mini-slot is indicated by information provided by the MAC controller 206. One mini-slot before the beginning of the next burst region, the MAC controller 206 sends a 64-bit map information of that burst region to the burst receiver 202. The burst receiver 202 fetches internal re-configuring parameters based on the burst type specified in the MAP data just received. The burst receiver 202 then re-configures itself and starts to acquire the carrier phase and symbol timing on the incoming burst's preamble. The payload after the preamble will then be processed by the FEC decoder 263, and sent to an output FIFO (part of the FEC decoder 263).

Once a decoded FEC data block starts to enter the output FIFO located in front of the MAC receive interface 265, the embodiment prepends overhead (e.g. 2 bytes) to the FEC data block and sends the expanded data block to the MAC/PHY interface 265.

Depending on the data burst type, the burst receiver 202 may also prepend additional channel information such as received burst power, frequency offset, arrival time error, adaptive equalizer coefficients, etc., to the last FEC data block of a burst. The expanded data block is transferred to the MAC controller 206.

The burst receiver 202 of the embodiment also features an advanced MAC/PHY interface mode which is compatible to the DOCSIS MAC/PHY Interface (DMPI) specification. This interface contains two sub-interfaces—the receive data interface and the MAP interface.

In DOCSIS applications, the external/on-chip ADC's sample rate $F_{SMPL}$ is 40.96 MHz in the low-IF input mode or base-band I/Q input mode. The acceptable low-IF center frequency ranges from ($F_{BAUD, MAX} \times 1.25/2$) to roughly ($F_{SMPL}/10$), or from 3.2 MHz to 4 MHz for DOCSIS. In the direct-RF sampling mode for North-American DOCSIS, $F_{SMPL}$ should be at least 102.4 MHz. In the direct-RF sampling mode for Euro-DOCSIS, $F_{SMPL}$ should be 163.84 MHz. Even with an $F_{SMPL}$ as high as 163.84 MHz, the synthesis resolution of the digital mixing frequency is still as small as 9.766 Hz.

In the DOCSIS standard, the allocation of the entire upstream bandwidth among multiple transmitters in both the frequency and time domains is described in a Bandwidth Allocation Map (MAP) (see FIG. 6), which is maintained by the management system. In each frequency channel, its time axis is partitioned into Burst Regions to handle different burst types. Each burst region starts and ends on mini-slot boundaries, and may contain one burst or multiple bursts. One mini-slot cycle before the next burst region, the MAC controller 206 selects a portion of the MAP which describes that particular burst region, and sends that MAP information element (IE) to the burst receiver 202.

During normal operations, the burst receiver 202 receives the service-ID (SID) of the next burst region from incoming MAP information sent by the MAC controller 206. The user may choose to start FFT processes in all burst regions that have a particular SID.

During normal operations, the burst receiver 202 receives the burst-region type of the next burst region from incoming MAP information sent by the MAC controller 206. The user may choose to start FFT processes in all burst regions that belong to a particular type.

To achieve higher frequency resolutions, the FFT processor 250 can analyze only a certain segment of the ADC input bandwidth by passing the ADC output samples through the quadrature digital down-mixer 252 and a decimation stage 255, 256 before doing the FFT computation. The down-mixer 252 uses the quadrature carrier generated by a digital frequency synthesizer 273.

The forward error correction 263 interface uses inputs from the descrambler 272 and the RS decoder 264. Output from the forward error correction interface 263 is used by the deinterleaver 262 and the MAC/PHY interface 265 for Receive Channel A 279. Receive Channel B 266 also outputs data to the MAC/PHY interface 267 for Channel B 266. The FFT processor 250 interfaces with the analog front end (AFE) 251 and with both Receive Channel B 266 and Receive Channel A 279, as shown in FIG. 2B. The burst receiver 202 also has provisions for a JTAG interface 268 (preferably conforming to IEEE Standard 1149.1 for board connection checking), a phase lock loop (PLL) and clock generator 269, and a micro controller interface 270.

FIG. 3 is a block diagram of the FFT processor 250. The FFT processor 250 includes an FFT start controller 302, a tuner module 304, and selectors 306, 308, 310 and 312.

The FFT processor 250 receives wideband information sequences 324a, 324b from the front-end module 251. The wideband sequences 324a, 324b are each sampled digital sequences that convey the entire spectrum of the shared communications medium 210 coupled to the corresponding receiver 202 module.

An exemplary bandwidth for such wideband sequences is 50 MHz. The sequences 324a, 324b are received at the selector 306. A channel select control signal 350 selects either sequence 324a or sequence 324b to be passed along as a sequence 324c. The sequence 324c is sent to the tuner module 304 and the selector 312.

The FFT processor 250 also receives channel sequences 328a, 328b at selector 308 from the AFE 251. The sequences 328a, 328b each have a bandwidth that corresponds to the tuned bandwidth of the front-end module 251. As described above with reference to wideband sequences 324a, 324b, the control signal 350 selects either the sequence 328a or the sequence 328b to be output and sent to the selector 312 as the sequence 328c.

The tuner module 304 receives the sequence 324c, and generates a plurality of output sequences that each have different spectral characteristics. For instance, the tuner module 304 outputs a wideband sequence 330. In addition, the tuner module 304 also outputs a half-band sequence 332, and a quarter-band sequence 334. As shown in FIG. 3, the sequences 330, 332 and 334 are each sent to the selector 312.

Thus, the tuner module 304 allows spectral analysis to be performed on various portions of the spectrum received by the AFE 251.

The selector 312 receives a plurality of information sequences. Based on the value of an input selection signal 360, the selector 312 sends one of these information sequences to the FFT processor 250 as a load data sequence 370.

The FFT processor 250 receives load data sequence 370 and performs a Discrete Fourier Transform (DFT) on the data sequence 370 using FFT techniques for computational efficiency. (See, e.g., FIG. 7, illustrating the overall operation of the burst receiver 202). This results in the FFT processor 250 producing an FFT output sequence 380. The FFT processor 250 performs FFT operations using a parameter set 320 that it receives from the MAC controller 206. The parameter set 320 is user configurable, and may be stored in one or more memory registers that are included in the receiver 202.

The timing of FFT's is controlled by the FFT start controller 302, which receives a trigger signal 322. The trigger signal 322 indicates that the performance of an FFT by the FFT processor 250 is desired.

The FFT start controller 302 receives an FFT ready signal 346 from the FFT processor 250. The ready signal 346 indicates that the FFT processor 250 is ready to perform an FFT on the data sequence 370. When this condition occurs, the FFT start controller 302 may provide an FFT start command 344 to the FFT processor 250. The start command 344 directs the FFT processor 250 to perform an FFT on the samples of the data sequence 370 that are contemporaneously being sent to the FFT processor 250.

A header signal 342 can be prepended to the FFT output. This enables the marking of FFT results with a time stamp or index. This feature advantageously enables FFT results (that are output by the FFT processor 250 as the FFT sequence 380) to be stored in a memory (not shown) and accessed at a later time for analysis. An exemplary header signal 342 is 4-bytes in length. However, other lengths may be used.

The initiation of FFT's by the FFT processor 250 may be controlled according to various modes. In one such mode, FFT operations are initiated by an external trigger command. In another mode, FFT operations are initiated automatically upon the occurrence of one or more pre-programmed events. These modes of operation are selected through configuration data that is described below in greater detail. The ADC 251 receives an input signal 220, such as an upstream transmission from the shared communications medium 210. The input signal 220 is an analog waveform having a spectrum that is bounded by an upper frequency $F_U$.

The ADC 251 converts the analog input signal 220 into a sampled digital sequence having a sampling rate of $F_{SMPL}$. $F_{SMPL}$ is greater than or equal to twice $F_U$ (i.e., the Nyquist sampling rate). As noted above, exemplary $F_{SMPL}$ values include 100 MHz for United States DOCSIS applications and 160 MHz for European DOCSIS (EuroDOCSIS) applications. However, other sampling rates may be employed. As a result of the sampling, the ADC 251 produces a digital signal 307, which is sent to the tuner module 304 and a selector 312. The digital signal 307 includes a train of samples occurring at $F_{SMPL}$ that are each represented by a number of bits, such as 12 bits.

FIG. 4 is a block diagram further illustrating an implementation of a spectral analysis module 400. As shown in FIG. 4, the spectral analysis module 400 includes an analog to digital converter (ADC) 251 (part of the AFE 251), a tuner module 304, a selector 312, and the FFT processor 250.

The tuner module 304 provides the burst receiver 202 with the capability to analyze particular portions of the spectrum associated with the spectrum of the input signal 220. Thus, the embodiment permits to "zoom in" to analyze particular portions of this spectrum in greater detail than if an FFT was performed across the entire spectrum of the input signal 220.

As shown in FIG. 4, the tuner module 304 generates a decimation stage sequence set that includes sequences 430a and 430b, and a quarter band sequence set that includes sequences 434a and 434b.

The tuner module 304 includes the mixer 252, and a decimation filter) stage 440. The mixer 252 receives the digital signal 307 from the ADC of the AFE 251. The mixer 252 down-converts the digital signal 307 from its respective frequency band to baseband. The mixer 252 generates an in-phase baseband digital sequence 430a and a quadrature baseband digital sequence 430b. The baseband sequences 430a, 430b are sent to the decimation filter stage 440.

The decimation filter stage 440 receives baseband sequences 430a, 430b, and produces output sequences 434a and 434b, which have a quadrature relationship with one another, and corresponding to the signals 430a, 430b decimated to $F_{SMPL}/4$.

The selector 312 receives the digital sequence 307 and the output sequences 434a, 434b. As shown in FIG. 4, the selector 312 also receives a control signal 360. The control signal 360 selects which of the digital sequences is sent to the FFT processor 250. This selected signal is transferred to the FFT processor 250 as the digital sequence 370.

The selector 312 combines in-phase and quadrature sequence pairs to produce a single sequence. The combined sequence is passed to the FFT processor 250 as the digital sequence 370. For example, upon selection by the control signal 360, the selector 312 combines the sequences 434a and 434b to produce the single sequence 370.

The tuner module 304 also includes a frequency synthesizer 273 and a sinusoid waveform generator 406. The frequency synthesizer 273 generates a clock signal 424 having a frequency that is selected to convert signals within a desired portion of the RF spectrum to baseband. The sinusoid waveform generator 406 receives the clock signal 424 and, in response, produces sinusoidal waveforms 426 and 428. The waveforms 426 and 428 are substantially 90 degrees out of phase. The mixer 252 receives the signals 426 and 428 and multiplies each of these waveforms with the digital sequence 307. This multiplication results in sequences 430a and 430b.

FIG. 5 is a block diagram showing the FFT processor 250 in additional detail. As shown in FIG. 5, the FFT processor 250 includes an input interface 560, an FFT calculation module 562, and an output interface 564.

The input interface 560 includes an FFT controller 502, a load controller 504, a first selector 508, and a second selector 510. The FFT controller 502 receives the parameter set 320 from the MAC controller 206. The parameter set 320 determines various properties of FFT's performed by the FFT processor 250. For example, the parameter set 320 determines the windowing and averaging techniques performed by the FFT processor 250.

The load controller 504 receives load data sequence 370 from the selector 312. In addition, the load controller 504 exchanges information with the FFT start controller 302. Namely, the load controller 504 receives the header signal 342, and a start command 344. In addition, the load controller 504 generates the FFT ready signal 346, and sends the ready signal 346 to the FFT start controller 302. As described above with reference to FIG. 3, the ready signal 346 indicates to the start controller 302 that the FFT processor 250 is ready to perform an FFT operation.

The FFT controller 502 operates as a scheduler (i.e., clock) that controls the sequence of operations that the FFT processor 250 performs in calculating FFT's.

The calculation module 562 includes a random access memory (RAM) 512, a read-only memory (ROM) 514, an arithmetic unit 516, a windowing filter 518, and an averaging filter 520.

Additionally, the calculation module 562 includes a square root module 522 and a selector 506.

The RAM 512 receives a control signal 522 and an information sequence 524. The control signal 522 governs the timing of operations within the RAM 512. For instance, the control signal 522 controls when the RAM 512 stores (i.e., writes) information included in sequence 524. In addition, the control signal 522 governs when information stored in RAM 512 is outputted as an output sequence 526. Output sequence 526 is sent to various elements within calculation module 562. For example, FIG. 5 shows output sequence 526 being sent to the square root module 522, an arithmetic unit 516, a windowing filter 518, and an averaging filter 520. These elements receive and perform operations on the sequence 526 during particular portions of the FFT calculation process.

The FFT process is typically started when a certain real-time MAP parameter matches a pre-programmed number. The FFT process will start repetitively whenever the MAP information from MAC controller 206 matches a pre-programmed pattern. During an FFT process, the FFT processor 250 will ignore any matching results until the whole process is finished.

A straight-forward FFT uses a rectangular time window to collect input samples. If the input is a sine wave and the time window does not cover an integer multiple of sine wave periods (i.e., the input tone frequency does not sit on an FFT frequency bin), then the FFT output will have very high side lobes around the input tone frequency, which makes multi-tone differentiation more difficult or even impossible if a small input tone is masked by a side lobe of a large input tone. Therefore, many time-domain input-weighting windows have been proposed to re-shape the input waveform and to lower the side lobes in the FFT result. The same artificial windowing can be done in the frequency domain after the FFT computation.

The burst receiver 202 preferably performs the frequency-domain windowing by using a symmetrical 5-tap sliding filter.

In the embodiment, FFT input sources may be selected from either Receive Channel A or B 279/266. Options include ADC, ADC decimated by 2, ADC decimated by 4, Nyquist, and ICF (ingress cancellation filter) Outputs. Due to a flexible start control, the FFT can be triggered by either using an input pin or by matching MAP burst parameters. The embodiment supports sum-of-cosine windows, as well as Hanning, Hamming, Blackman, Harris windows, etc. As another example, the FFT power spectrum can be averaged using a leaky integrator. The time constant can be programmable to control the averaging convergence time FFT Features.

The output format of the FFT processor 250 may be, for example, 2-byte magnitude of FFT frequency bins, 4-byte power of FFT frequency bins, 4-byte complex I-Q values of FFT frequency bins, or 4-byte complex I-Q values of raw input data (bypass mode). The outputted FFT may include a time stamp corresponding to the mini-slot. The FFT may be performed on a time interval that includes a single mini-slot, on multiple mini-slots corresponding to the same subscriber ID (i.e., service ID), on an empty noise slot, or a noise corresponding to a null SID. The FFT may be performed on an entire packet received, or on a portion of the packet.

The present invention is not limited to cable modem systems. For instance, the present invention may be employed by wireless communications systems, satellite communications systems, and optical communications systems. Furthermore, the present invention is not limited to TDMA. For example, code division multiple access (CDMA) systems and orthogonal frequency division multiple access (OFDMA) systems may use the present invention.

It will be appreciated that the various inventions described herein and in U.S. Provisional Patent Application No. 60/296,450, filed on Jun. 8, 2001, entitled "ROBUST BURST DETECTION ACQUISITION SYSTEM AND METHOD," and U.S. patent application Ser. No. 60/106,441, filed on Oct. 30, 1998, entitled "BURST RECEIVER SYSTEM", all of which are incorporated herein by reference, may be combined in various ways in a single system.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of managing traffic in a shared communications channel, the shared communications channel being shared by a plurality of subscribers, each of the plurality of subscribers being assigned to a corresponding service identifier (SID) from among a plurality of SIDs, comprising:
   (a) receiving, by a communications receiver, a SID from a media access controller (MAC) corresponding to a subscriber from among the plurality of subscribers;
   (b) receiving, by the communications receiver, a plurality of signals from the plurality of subscribers over the shared communications channel;
   (c) performing, by the communications receiver, a spectral analysis of one of the plurality of signals corresponding to the SID to provide quality information regarding the shared communications channel, the spectral analysis comprising:
      (i) generating a plurality of frequency ranges based upon the one of the plurality of signals, each of the plurality of frequency ranges corresponding to different spectral characteristics,
      (ii) selecting one of the frequency ranges from among the plurality of frequency ranges to provide a selected frequency range, and
      (iii) performing the spectral analysis of the selected frequency range to provide spectral measurements arranged in a plurality of bins, each bin corresponding to a respective frequency range; and
   (d) adjusting transmission characteristics of the subscriber based on the spectral measurements.

2. The method of claim 1, wherein step (d) comprises:
   (d)(i) adjusting a transmission power of the subscriber based on the spectral measurements.

3. The method of claim 1, wherein step (c)(iii) comprises:
   (c)(i)(A) performing a Discrete Fourier Transform (DFT) on the selected frequency range.

4. The method of claim 1, wherein step (c) further comprises:
   (c)(iv) extracting burst noise information from the selected frequency range.

5. The method of claim 1, wherein step (c) further comprises:
   (c)(iv) calculating channel signal-to-noise information from the selected frequency range.

6. The method of claim 1, wherein step (c)(iii) comprises:
(c)(iii)(A) performing a Fast Fourier Transform (FFT) on the selected frequency range.

7. The method of claim 6, wherein step (c)(i)(A) comprises:
(c)(i)(A)(1) performing the FFT on the selected frequency range with a radix 2 decimation-in-time algorithm.

8. The method of claim 6, wherein step (c)(i)(A) comprises:
(c)(i)(A)(1) performing the FFT on the selected frequency range with a windowing algorithm.

9. The method of claim 6, wherein step (c)(i)(A) comprises:
(c)(i)(A)(1) performing the FFT on the selected frequency range with multiple-FFT-averaging.

10. The method of claim 1, wherein step (c)(ii) comprises:
(c)(ii)(A) selecting the one of the frequency ranges that is characterized as having an empty noise slot.

11. The method of claim 1, wherein step (a) comprises:
(a)(i) receiving a null ID corresponding to the subscriber.

12. The method of claim 1, wherein step (c)(ii) comprises:
(c)(ii)(A) selecting the of the frequency ranges that is characterized as having an entire packet received from the subscriber within a time interval corresponding to the subscriber ID.

13. The method of claim 1, wherein step (c)(ii) comprises:
(c)(ii)(A) selecting the one of the frequency ranges that is characterized as having a portion of a packet received from the subscriber within a time interval corresponding to the subscriber ID.

14. The method of claim 1, wherein step (c)(iii) comprises:
(c)(iii)(A) performing the spectral analysis on the selected frequency range within a time interval corresponding to the subscriber ID.

15. The method of claim 1, wherein step (d) comprises:
(d)(i) adjusting at least one of a group consisting of: symbol rate, forward error correction parameters, and modulation type of the subscriber based on the spectral the spectral measurements.

16. A method of controlling transmission in a communications channel, the communications channel being shared by a plurality of subscribers, each of the plurality of subscribers being assigned to a corresponding service identifier (SID) from among a plurality of SIDs, comprising:
(a) receiving, by a communications receiver, a SID identifying a time interval corresponding to a subscriber from among the plurality of subscribers;
(b) receiving, by the communications receiver, a plurality of signals from the plurality of subscribers over the communications channel;
(c) performing, by the communications receiver, a spectral analysis of one of the plurality of signals received during the time interval identified by the SID to provide quality information regarding the communications channel, the spectral analysis comprising:
  (i) generating a plurality of frequency ranges from the one of the plurality of signals, each of the plurality of frequency ranges having different spectral characteristics,
  (ii) selecting one of the frequency ranges from among the plurality of frequency ranges to provide a selected frequency range, and
  (iii) performing the spectral analysis of the selected frequency range to provide spectral measurements arranged in a plurality of bins, each bin corresponding to a respective frequency range; and
(d) adjusting transmission characteristics of the subscriber based on the spectral measurements.

17. The method of claim 16, wherein step (d) comprises:
(d)(i) adjusting a transmission power of the subscriber based on the spectral measurements.

18. The method of claim 16, wherein step (c) comprises:
(c)(i) performing a Discrete Fourier Transform (DFT) on the selected frequency range during the time interval identified by the subscriber ID.

19. The method of claim 16, wherein step (c) comprises:
(c)(i) extracting burst noise information from the selected frequency range during the time interval identified by the subscriber ID.

20. The method of claim 16, wherein step (c) comprises:
(c)(i) calculating channel signal-to-noise information from the selected frequency range during the time interval identified by the subscriber ID.

21. The method of claim 16, wherein step (c) comprises:
(c)(i) performing a Fast Fourier Transform (FFT) on the selected frequency range during the time interval identified by the subscriber ID.

22. The method of claim 21, wherein step (c)(i) comprises:
(c)(i)(A) performing the Fast Fourier Transform (FFT) on the selected frequency range during the time interval identified by the subscriber ID with a radix 2 decimation-in-time algorithm.

23. The method of claim 21, wherein step (c)(i) comprises:
(c)(i)(A) performing the Fast Fourier Transform (FFT) on the selected frequency range during the time interval identified by the subscriber ID with a windowing algorithm.

24. The method of claim 21, wherein step (b)(i) comprises:
(b)(i)(A) performing the Fast Fourier Transform (FFT) on the selected frequency range during the time interval identified by the subscriber ID with multiple-FFT-averaging.

25. The method of claim 16, wherein step (c)(iii) comprises:
(c)(iii)(A) performing the spectral analysis on the selected frequency range during an empty noise slot identified by the subscriber ID.

26. The method of claim 16, wherein step (c)(iii) comprises:
(c)(iii)(A) performing the spectral analysis on the selected frequency range during the time interval identified by a null ID.

27. The method of claim 16, wherein step (a) comprises:
(a)(i) receiving the subscriber ID identifying a plurality of time intervals corresponding to the subscriber, and
wherein step (c)(ii) comprises:
(c)(ii)(A) selecting a plurality of packets received during the plurality of time intervals identified by the subscriber ID as the selected frequency range.

28. The method of claim 16, wherein step (c)(ii) comprises:
(c)(ii)(A) selecting the one of the frequency ranges that is characterized as having an entire packet received during the time interval identified by the subscriber ID.

29. The method of claim 16, wherein step (c)(ii) comprises:
(c)(ii)(A) selecting the one of the frequency ranges that is characterized as having a portion of a packet received during the time interval identified by the subscriber ID.

30. The method of claim 16, wherein step (d) comprises:
(d)(i) adjusting at least one of a group consisting of: symbol rate, forward error correction parameters, and modulation type of the subscriber based on the spectral measurements.

31. The method of claim 16, further comprising:
(e) sending one or more adjustment signals defining adjustment of one or more of the transmission characteristics.

32. A method of controlling communications traffic across an upstream traffic channel, the upstream traffic channel being shared by a plurality of subscribers, each of the plurality of subscribers being assigned to a corresponding service identifier (SID) from among a plurality of SIDs, comprising:
(a) specifying, by a communications receiver, a spectral analysis time interval corresponding to a SID from among the plurality of SIDs;
(b) receiving, by the communications receiver, a plurality of upstream transmissions from the plurality of subscribers over the upstream traffic channel, wherein one of the plurality of upstream transmissions corresponds to the SID, the one of the plurality of upstream transmissions being within the spectral analysis time interval;
(c) performing, by the communications receiver, a spectral analysis of the one of the plurality of upstream transmissions corresponding to the SID to provide quality information regarding the upstream traffic channel, the spectral analysis comprising:
  (i) generating a plurality of frequency ranges from the one of the plurality of upstream transmissions, each of the plurality of frequency ranges having different spectral characteristics,
  (ii) selecting one of the frequency ranges from among the plurality of frequency ranges to provide a selected frequency range, and
  (iii) performing the spectral analysis of the selected frequency range to provide spectral measurements arranged in a plurality of bins, each bin corresponding to a respective frequency range; and
(d) adjusting at least one transmission characteristic of the upstream traffic channel based on the spectral measurements.

33. The method of claim 32, wherein step (a) comprises:
(a)(i) identifying a time interval corresponding to the one of the plurality of upstream transmissions corresponding to the SID.

34. The method of claim 33, wherein step (a)(i) comprises:
(a)(i)(A) identifying an empty noise slot corresponding to the one of the plurality of upstream transmissions corresponding to the SID.

35. The method of claim 32, wherein step (a)(i) comprises:
(a)(i) specifying the spectral analysis time interval corresponding to a null ID.

36. The method of claim 32, wherein step (a) comprises:
(a)(i) specifying at least one time division multiple access (TDMA) mini-slot corresponding to the subscriber ID.

37. The method of claim 32, wherein step (c)(ii) comprises:
(c)(ii) selecting the one of the frequency ranges corresponding to the SID, and wherein step (c)(iii) comprises:
(c)(i) performing a Discrete Fourier Transform (DFT) of the selected frequency range.

38. The method of claim 32, wherein step (d) comprises:
(d)(i) changing an upstream transmission power level of the upstream traffic channel based on the spectral measurements.

39. The method of claim 32, wherein step (a) comprises:
(a)(i) specifying a plurality of spectral analysis time intervals corresponding to the subscriber ID.

40. The method of claim 32, wherein step (d) comprises:
(d)(i) adjusting at least one of a group consisting of: symbol rate, forward error correction parameters, and modulation type of the upstream traffic channel based on the spectral measurements.

41. A method of controlling communications traffic across a traffic channel, the traffic channel being shared by a plurality of subscribers, each of the plurality of subscribers being assigned to a corresponding service identifier (SID) from among a plurality of SIDs, comprising:
(a) receiving, by a communications receiver, a plurality of transmissions from the plurality of subscribers over the traffic channel, wherein one of the plurality of transmissions corresponds to a SID from among the plurality of SIDs, the one of the plurality of transmissions being within a time interval corresponding to the SID;
(b) performing, by the communications receiver, a spectral analysis on the one of the plurality of transmissions corresponding to the SID to provide quality information regarding the traffic channel, the spectral analysis comprising:
  (i) generating a plurality of frequency ranges from the one of the plurality of transmissions, each of the plurality of frequency ranges having different spectral characteristics,
  (ii) selecting one of the frequency ranges from among the plurality of frequency ranges to provide a selected frequency range, and
  (iii) performing the spectral analysis of the selected frequency range to provide spectral measurements arranged in a plurality of bins, each bin corresponding to a respective frequency range; and
(c) adjusting at least one transmission characteristic of the subscriber based on the spectral measurements.

42. The method of claim 41, wherein step (b)(ii) comprises:
(b)(ii)(A) selecting the one of the frequency ranges corresponding to the SID, and wherein step (b)(iii) comprises:
(b)(iii)(A) performing a Discrete Fourier Transform (DFT) of the selected frequency range.

43. The method of claim 41, wherein step (c) comprises:
(c)(i) changing a transmission power level of the subscriber based on the spectral measurements.

44. The method of claim 41, wherein step (a) comprises:
(a)(i) receiving an entire packet within the time interval.

45. The method of claim 41, wherein step (a) comprises:
(a)(i) receiving a portion of a packet within the time interval.

46. The method of claim 41, wherein step (a) comprises:
(a)(i) receiving a plurality of packets within the time interval.

47. The method of claim 41, wherein step (d) comprises:
(d)(i) adjusting at least one of a group consisting of: symbol rate, forward error correction parameters, and modulation type of the traffic channel based on the spectral measurements.

* * * * *

UNITED STATES PATENT AND TRADEMARK OFFICE
CERTIFICATE OF CORRECTION

| | | |
|---|---|---|
| PATENT NO. | : 7,804,772 B2 | Page 1 of 1 |
| APPLICATION NO. | : 10/164355 | |
| DATED | : September 28, 2010 | |
| INVENTOR(S) | : Min et al. | |

It is certified that error appears in the above-identified patent and that said Letters Patent is hereby corrected as shown below:

At column 17, lines 39-40, "based on the spectral the spectral measurements" should read --based on the spectral measurements--.

Signed and Sealed this
Sixteenth Day of August, 2011

David J. Kappos
*Director of the United States Patent and Trademark Office*